(12) United States Patent
Anderson et al.

(10) Patent No.: US 8,161,187 B2
(45) Date of Patent: Apr. 17, 2012

(54) STREAM PROCESSING WORKFLOW COMPOSITION USING AUTOMATIC PLANNING

(75) Inventors: Kay S. Anderson, Washington, DC (US); Joseph Phillip Bigus, Rochester, MN (US); Mark David Feblowitz, Winchester, MA (US); Genady Ya. Grabarnik, Scarsdale, NY (US); Nagui Halim, Yorktown Heights, NY (US); Zhen Liu, Tarrytown, NY (US); Anton V. Riabov, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1020 days.

(21) Appl. No.: 12/114,105

(22) Filed: May 2, 2008

(65) Prior Publication Data

US 2008/0235691 A1    Sep. 25, 2008

Related U.S. Application Data

(63) Continuation of application No. 11/361,877, filed on Feb. 24, 2006, now abandoned.

(51) Int. Cl.
*G06F 15/173* (2006.01)
(52) U.S. Cl. .................. 709/238; 709/226; 718/104
(58) Field of Classification Search .............. 709/238, 709/226, 227, 228, 229; 718/102, 104
See application file for complete search history.

(56) References Cited

U.S. PATENT DOCUMENTS

| | | | |
|---|---|---|---|
| 5,570,410 A | 10/1996 | Hooshiari | |
| 5,745,383 A | 4/1998 | Barber | |
| 5,745,652 A * | 4/1998 | Bigus | 706/14 |
| 6,112,194 A | 8/2000 | Bigus | |
| 6,263,335 B1 | 7/2001 | Paik et al. | |
| 6,996,680 B2 | 2/2006 | Mogi et al. | |
| 7,260,783 B1 | 8/2007 | Mika | |
| 7,644,110 B2 | 1/2010 | Nishizawa et al. | |
| 7,647,315 B2 | 1/2010 | Azizi | |
| 7,711,704 B2 | 5/2010 | Azizi | |
| 2003/0154158 A1 | 8/2003 | Martyn et al. | |
| 2003/0187652 A1 | 10/2003 | Fairman | |
| 2004/0117359 A1 | 6/2004 | Snodgrass et al. | |
| 2004/0254843 A1 | 12/2004 | Koch | |
| 2006/0294087 A1 | 12/2006 | Mordvinov | |
| 2007/0022092 A1* | 1/2007 | Nishizawa et al. | 707/2 |
| 2007/0038665 A1 | 2/2007 | Kwak et al. | |
| 2007/0061291 A1 | 3/2007 | Azizi | |
| 2007/0061305 A1 | 3/2007 | Azizi | |
| 2007/0079254 A1 | 4/2007 | Kwak et al. | |

(Continued)

OTHER PUBLICATIONS

Fox et al., "PDDL2.1: An Extension to PDDL for Expressing Temporal Planning Domains," Journal of Artificial Intelligence Reseach, 20:61-124, Dec. 2003.

(Continued)

*Primary Examiner* — Patrice Winder
*Assistant Examiner* — Tauqir Hussain
(74) *Attorney, Agent, or Firm* — Yee & Associates, P.C.; William Stock

(57) ABSTRACT

An automatic planning system is provided for stream processing workflow composition. End users provide requests to the automatic planning system. The requests are goal-based problems to be solved by the automatic planning system, which then generates plan graphs to form stream processing applications. A scheduler deploys and schedules the stream processing applications for execution within an operating environment. The operating environment then returns the results to the end users.

20 Claims, 7 Drawing Sheets

U.S. PATENT DOCUMENTS

2007/0086664 A1 4/2007 Kim et al.
2007/0086665 A1 4/2007 Kim et al.
2007/0204020 A1 8/2007 Anderson et al.
2008/0195924 A1 8/2008 Kim et al.

OTHER PUBLICATIONS

Gerevini et al., "LPG-TD: a Fully Automated Planner for PDDL2.2 Domains," Universita degli Studi di Brescia, Brescia, Italy, Dec. 2003, 2 pages.

Ghallab et al., "PDDL—The Planning Domain Definition Language, Version 1.2," Yale Center for Comutational Vision and Control, Tech Report CVC TR-98-003/DCS TR-1165, Oct. 1998, 27 pages.

Hochbaum et al., "Node-Optimal Connected k-Subgraphs," Department of Industrial Engineering and Operations Research, University of California, Berkley, California, Aug. 4, 1994, 6 pages.

Hoffmann, "The Metric-FF Planning System: Translating 'Ignoring Delet Lists' to Numeric State Variables," J. of Artificial Intelligence Research, 20:291-341, Dec. 2003.

USPTO Office Action regarding U.S. Appl. No. 11/361,877, dated Oct. 30, 2008, 10 pages.

USPTO Response to Office Action regarding U.S. Appl. No. 11/361,877, dated Jan. 30, 2009, 16 pages.

USPTO Final Office Action regarding U.S. Appl. No. 11/361,877, dated Apr. 9, 2009, 11 pages.

* cited by examiner

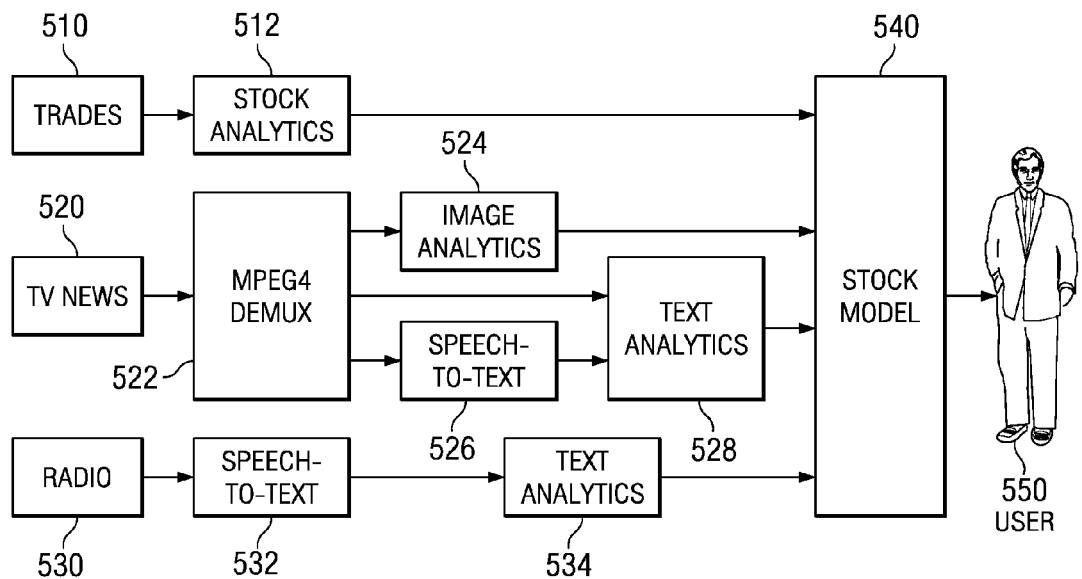

FIG. 5

```
<xs:import namespace="http://www.ibm.com/planner/model/domain" schemaLocation="xsppl-
domain1.xsd"/>

<xs:import namespace="http://www.ibm.com/planner/model/problem" schemaLocation="xsppl-
problem1.xsd"/>

<xs:element name="task">
  <xs:complexType>
   <xs:sequence>
      <xs:element name="domain" type="domain:domainType"/>
      <xs:element name="problem" type="problem:problemType"/>
   </xs:sequence>
  </xs:complexType>
</xs:element>
```

FIG. 6A

```
<xs:element name="problem" type="problem:problemType"/>
<xs:complexType name="problemType">
<xs:sequence>
  <xs:element name="name" type="xs:string"/>
        <xs:element name="domainName" type="xs:string"/>
        <xs:element name="requirements" type="domain:requirementsType" minOccurs="0"
        maxOccurs="1"/>
        <xs:element name="objectDeclaration" type="problem:objectDeclarationType"
        minOccurs="0" maxOccurs="1"/>
        <xs:element name="init" type="problem:initType"/>
        <xs:element name="goal" type="problem:goalType/>
        <xs:element name="metric-spec" type="problem:metric-specType" minOccurs="0"
        maxOccurs="1"/>
        <xs:element name="length-spec" type="problem:length-specType" minOccurs="0"
        maxOccurs="1"/>
  </xs:sequence>
</xs:complexType>

<xs:complexType name="objectDeclarationType">
  <xs:complexContent>
        <xs:extention base="domain:stream-constantsType"/>
  </xs:complexContent>
</xs:complexType>

<xs:complexType name="initType">
  <xs:sequence>
        <xs:element name="init-el" type="problem:init-elType" minOccurs="0"
maxOccurs="unbounded"/>
  </xs:sequence>
</xs:complexType>

<xs:complexType name="init-elType">
  <xs:choice>
        <xs:element name="predicate" type="problem:refGroundedPredicateType"/>
        <xs:element name="nonPredicate" type="problem:refGroundedPredicateType"/>
        <xs:element name="functionValue" type="problem:refFunctionValueType"/>
  </xs:choice>
</xs:complexType>
```

*FIG. 6B*

```
<xs:group name="stream-gd">
  <xs:sequence> <xs:choice>
        <xs:element name="predicate" type="domain:refPredicateType"/>
        <xs:element name="not" type="domain:notType"/>
        <xs:element name="and" type="domain:andType"/>
        <xs:element name="or" type="domain:orType"/>
        <xs:element name="exists" type="domain:existsType"/>
        <xs:element name="imply" type="domain:implyType"/>
        <xs:element name="forall" type="domain:forallType"/>
        <xs:element name="when" type="domain:whenType"/>
    <xs:group ref="domain:binaryComp"/>  </xs:choice>
        <xs:element name="stream" type="domain:streamType" minOccurs="0"/>
</xs:sequence>  </xs:group>
```

*FIG. 6C*

```
<xs:complexType name="stream-actionType">
  <xs:sequence>
            <xs:element name="parameter" type="domain:namedParameterType"
            minOccurs="1" maxOccurs="unbounded"/>
            <xs:element name="duration" type="domain:durationType" minOccurs="0"
            maxOccurs="1"/>
            <xs:group ref="domain:stream-condOrPrecond"/>
            <xs:element name="effect" type="domain:stream-effectType"/>
  </xs:sequence>
        <xs:attribute name="name" type="xs:string" use="required"/>
</xs:complexType>
```

*FIG. 6D*

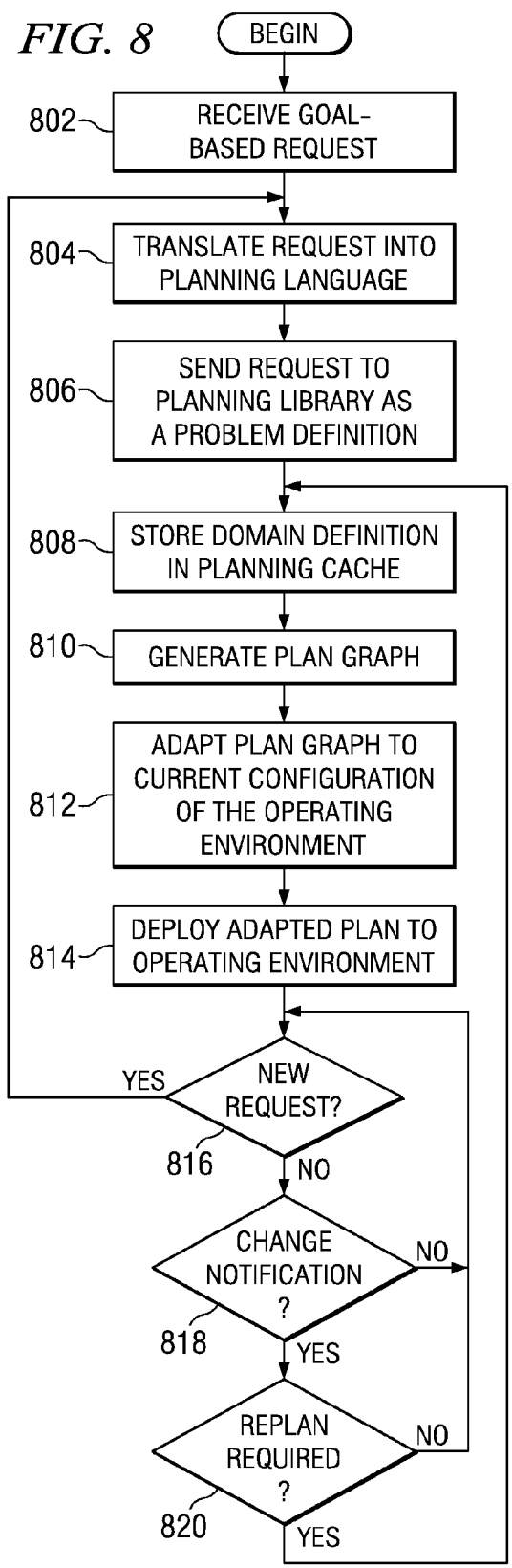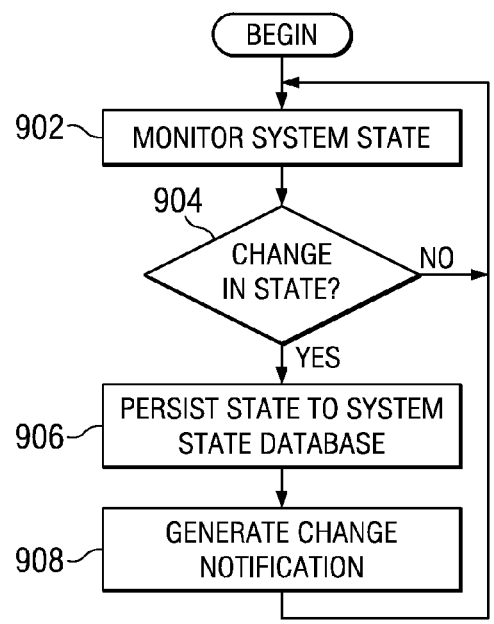

STREAM PROCESSING WORKFLOW COMPOSITION USING AUTOMATIC PLANNING

This application is a continuation of application Ser. No. 11/361,877, filed Feb. 24, 2006 now abandoned, status pending.

This invention was made with Government support under Contract No. TIA H98230-04-3-0001 awarded by U.S. Department of Defense. The Government has certain rights to this invention.

BACKGROUND OF THE INVENTION

1. Field of the Invention

The present invention relates generally to stream processing and, in particular, to workflow composition. Still more particularly, the present invention provides a method, apparatus, and program product for stream processing workflow composition using automatic planning.

2. Description of the Related Art

Stream processing computing applications are applications in which the data coming into the system in the form of information flow, satisfying some restriction on the data. Note that volume of data being processed may be too large to be stored and, therefore, the information flow must be processed on the fly. Examples of stream processing computing applications include video processing, audio processing, streaming databases, and sensor networks.

Component-based Software Systems (CBSE) are concerned with the development of software intensive systems from reusable parts (components), the development of reusable parts, and system maintenance and improvement by means of component replacement and customization, as well as development a framework for component composition. Composition may be done statically or dynamically. This disclosure is concerned with dynamic component composition.

We are concerned with specific component based systems, in particular stream processing component based systems. All the composition details and information about how to glue together system from the components, and how to configure components, are stored in the workflow. Workflow can provide in addition some extra information.

This approach enables increased code reuse, simplified development, and high flexibility of the system. Components may be interconnected in multiple configurations, achieving highly complex functionality via composition of simpler black-box operations. Such architectures are being currently developed in many application areas, in particular, stream processing applications.

In the component based stream processing architectures, the stream processing applications are composed of several processing units or components. The processing units can receive information streams on one or more input ports and produce one or more output streams, which are sent out via output ports. The output streams are a result of processing the information arriving via the input streams, by filtering, annotating, or otherwise analyzing and transforming the information. Once an output stream is created, any number of other components can read data from it. All processing units together compose a workflow. A stream processing application reads and analyzes primal streams coming into the system and produces a number of output streams that carry the results of the analysis.

Composing stream processing workflows is a labor-intensive task, which requires that the person building the workflow have an extensive knowledge of component functionality and compatibility. In many cases, this makes it necessary for end-users of stream processing applications to contact application developers each time a new output information stream is requested and, as a result, a new workflow is needed. This process is costly, error-prone, and time-consuming. Also, changes to other elements of the stream processing system may require changes to the workflow. For example, processing units or primal streams may become unavailable, users may place certain restrictions on the output, or changes may be made to the components themselves.

In large practical stream processing systems, both changes in the data coming into the system and changes in the system configuration can invalidate deployed and running stream processing applications. With time, these applications can start to produce output that no longer satisfies the user's requirements or they can be relying on primal streams that have become inactive or some additional system changes like adding new hardware or new components/processing units. In many situations, users' requirements can be better satisfied if an existing workflow is updated with newly available primal streams or components/processing units. Therefore, when changes such as those described above occur, the workflow must be reconfigured quickly, before any potentially valuable streaming data is lost. Such timely reconfiguration is extremely difficult to achieve if the workflow composition requires human involvement.

SUMMARY OF THE INVENTION

The present invention recognizes the disadvantages of the prior art and, in one illustrative embodiment, provides a method, in a stream processing system, for composing stream processing workflows using automatic planning. The stream processing system receives one or more primal streams and executes stream processing applications in a stream processing operating environment. The method comprises receiving a request for stream processing, translating the request for stream processing into a formal expression of the request in a description language, and generating a workflow based on the formal expression of the request and a domain definition in the description language. The domain definition describes the stream processing operating environment. The workflow comprises nodes corresponding to stream processing application components with possible parameters values set and links corresponding to streams.

In another illustrative embodiment, the method further comprises adapting the workflow into a stream processing application that is executable in the stream processing operating environment. In yet another embodiment, the method further comprises deploying the stream processing application to the stream processing operating environment.

In one exemplary embodiment, the method further comprises storing the domain definition in a planning cache.

In yet another illustrative embodiment, the method further comprises receiving a change notification that indicates one or more changes to the domain definition and adjusting the workflow based on the one or more changes to the domain definition to form an adjusted workflow. In one exemplary embodiment, the method further comprises adapting the adjusted workflow into an adjusted stream processing application that is executable in the operating environment. In another exemplary embodiment, the method further comprises deploying the adjusted stream processing application to the operating environment. In yet another exemplary embodiment, the method further comprises determining a new domain definition in response to the change notification and storing the new domain definition in the planning cache.

In another illustrative embodiment, a stream processing system composes stream processing workflows using automatic planning. The stream processing system receives one or more primal streams and executes stream processing applications. The stream processing system comprises a stream processing operating environment, a controller configured to receive a request for stream processing, a translation service configured to translate the request for stream processing into a formal expression of the request in a description language, and a planning library configured to generate a workflow based on the formal expression of the request and a domain definition in the description language. The domain definition describes the stream processing operating environment. The workflow comprises nodes corresponding to stream processing application components with possible parameters values set and links corresponding to streams.

In other illustrative embodiments, the stream processing system performs various ones of the operations outlined above with regard to the method in the illustrative embodiments.

In another illustrative embodiment, a computer program product for composing stream processing workflows using automatic planning comprises a computer usable medium having computer usable program code embodied therein, computer usable program code configured to receive a request for stream processing in a stream processing system, wherein the stream processing system receives one or more primal streams and executes stream processing applications in a stream processing operating environment, computer usable program code configured to translate the request for stream processing into a formal expression of the request in a description language, and computer usable program code configured to generate a workflow based on the formal expression of the request and a domain definition in the description language. The domain definition describes the stream processing operating environment. The workflow comprises nodes corresponding to stream processing application components with possible parameters values set and links corresponding to streams.

In other illustrative embodiments, the computer program product further comprises computer usable program code configured to perform ones of the operations outlined above with regard to the method in the illustrative embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 illustrates an example of stream processing in accordance with exemplary aspects of the described embodiments;

FIGS. 6A-6D are example code fragments that illustrate definition of domain and the problem in a stream processing system in accordance with exemplary embodiments;

FIG. 8 is a flowchart illustrating operation of an automated planning system for stream processing workflow composition in accordance with an exemplary embodiment; and FIG. 9 is a flowchart illustrating operation of system state monitoring in accordance with one exemplary embodiment.

DETAILED DESCRIPTION OF THE PREFERRED EMBODIMENT

Figure 1:
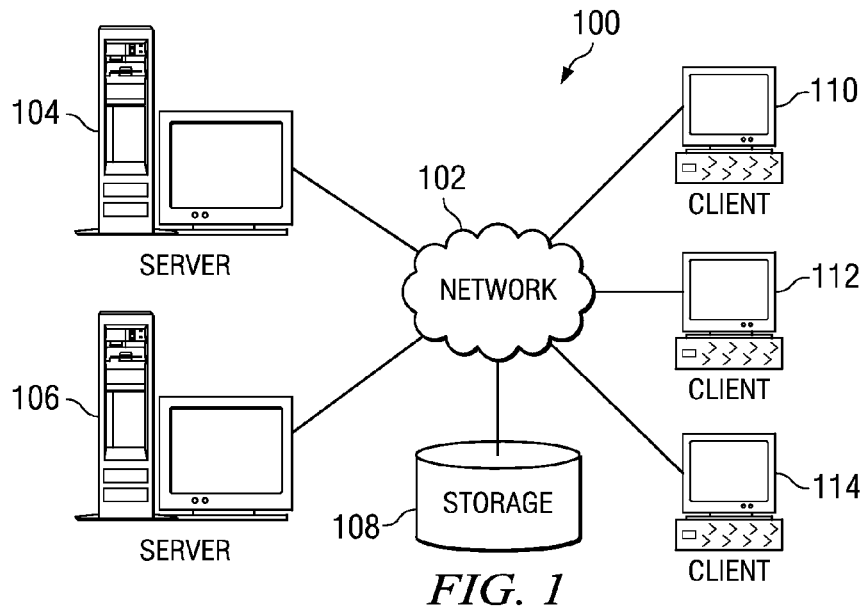
FIG. 1 is a pictorial representation of a network of data processing systems in which aspects of the present invention may be implemented.
Figure 2:
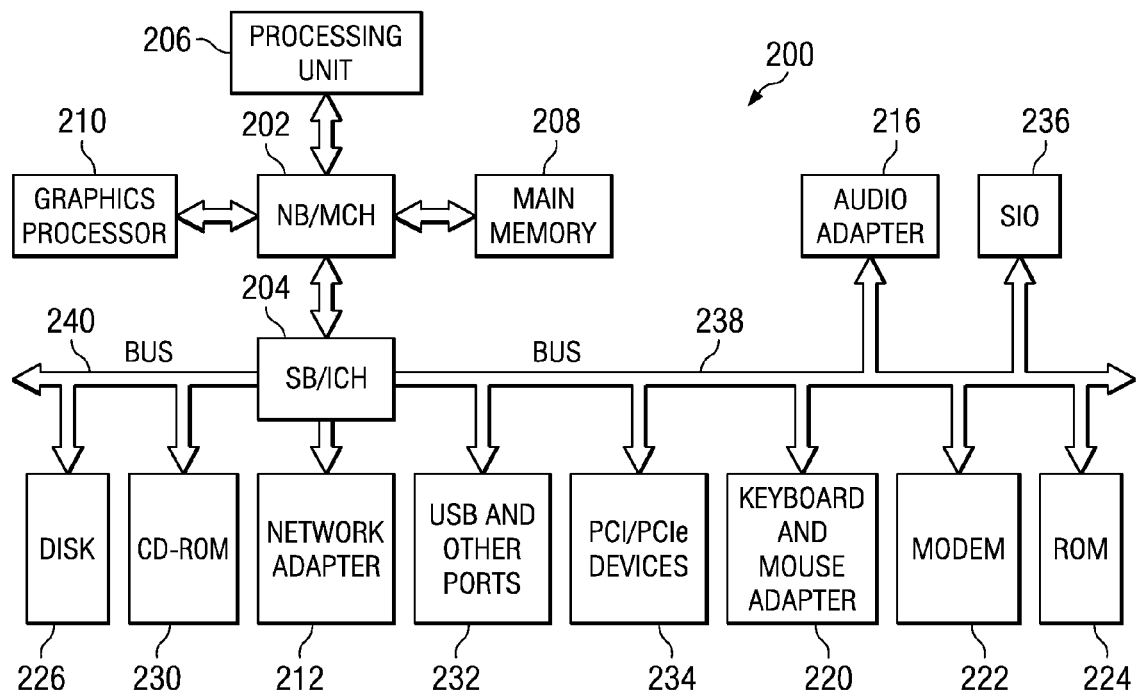
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 is a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In an exemplary embodiment, server 104 may provide stream processing applications to clients 110, 112, and 114. Clients 110, 112, and 114 are clients to server 104 in this example. Network data processing system 100 may include additional servers, clients, and other devices not shown.

In one exemplary embodiment, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

Local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (JAVA is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
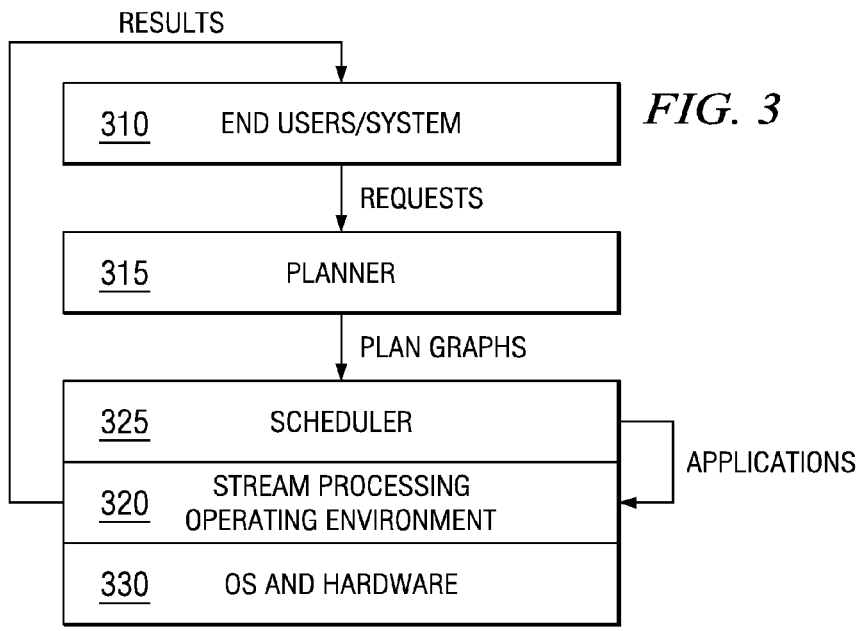
FIG. 3 illustrates an architecture for automatic composition of stream processing workflows satisfying output requirements expressed by end users or systems in accordance with an exemplary embodiment of the present invention.

FIG. 3 illustrates an architecture for automatic composition of stream processing workflows satisfying output requirements expressed by end users in accordance with an exemplary embodiment of the present invention. To apply artificial intelligence automatic planning techniques, the system must describe the initial state, the goal state, the conditions for applying each of the possible actions to the states, and the effects of each action. This may be done using a predicate-based description language. The plan is defined as a sequence of actions that lead from the initial state to a state that satisfies all goal requirements.

Latest advances in artificial intelligence planning started with the application of plan graph analysis methods to planning. Application of plan graph analysis essentially increased the size of planning problems that can be solved by automatic planners. Further development of automated planning systems was stimulated by introduction of a standard for the description language for planning domains and planning problems. Planning is an important aspect of the autonomic computing model, and it has always been considered as part of the autonomic monitor-analyze-plan-execute using knowledge (MAPE-K) loop.

Recognition of the application of automatic planning to stream processing workflow composition is an important aspect of the present invention. Referring again to FIG. 3, end users/systems 310 provide requests to planner 315. The requests are goal-based problems to be solved by planner 315, which then generates plan graphs to execute in the stream processing operating environment 320. Scheduler 325 deploys and schedules stream processing applications for execution within stream processing operating environment 320 on top of operating system and hardware 330. Stream processing operating environment 320 then returns the results to end users 310.

Figure 4:
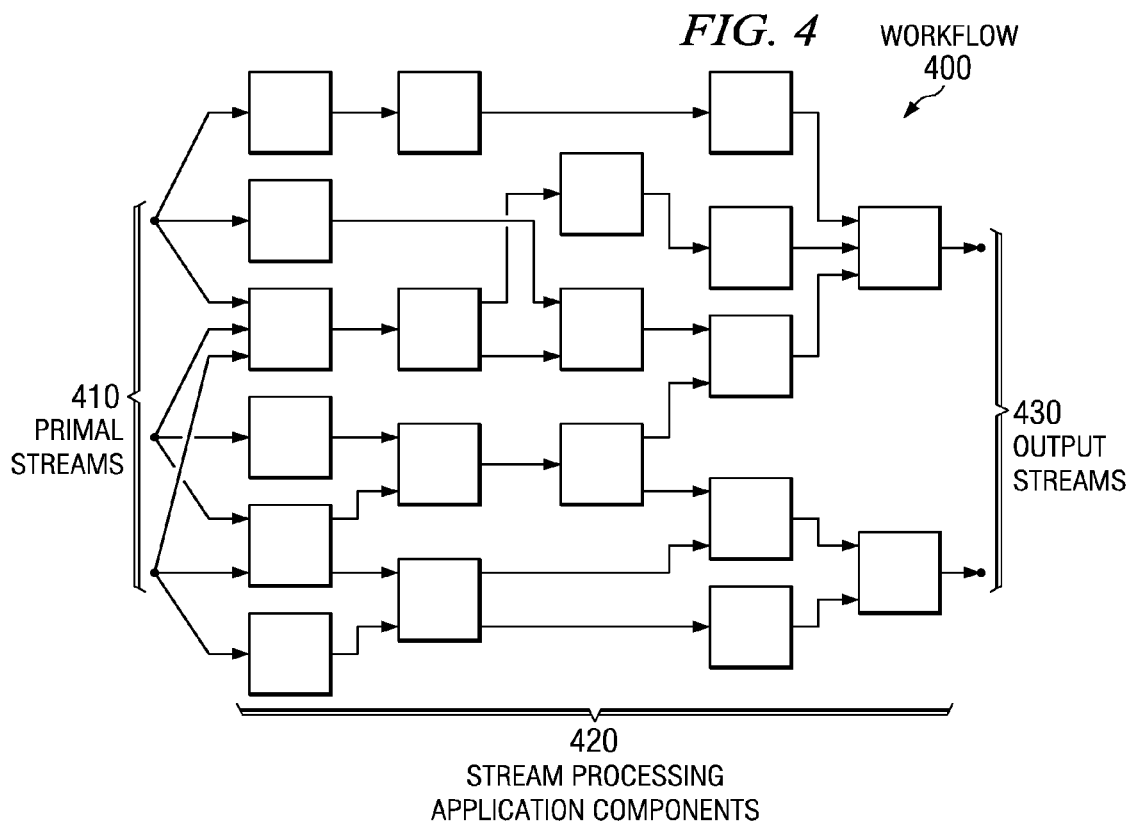
FIG. 4 illustrates an example of a stream processing workflow in accordance with exemplary aspects of the present invention.

FIG. 4 illustrates an example of a stream processing workflow in accordance with exemplary aspects of the present invention. Workflow 400 receives as input one or more primal streams 410. A stream represents a flow of information satisfying certain restrictions or constraints. An example of the stream data may be a sequence of n-tuples of a predefined format. Primal streams 410 are streams that are received by the stream processing system, but are not generated within the stream processing system. Examples of primal streams include television audio and video information, audio information from a radio broadcast, stock quotes and trades, really simple syndication (RSS) feeds, and the like.

Stream processing application components 420 are configured to receive, analyze, and/or transform primal streams 410 to form resulting output streams 430. Application components 420 may be reusable components that perform stream processing functions, such as, for example, video processing, image analysis, speech-to-text conversion, text analytics, and the like. Each one of application components 420 may have one or more inputs and one or more outputs.

The number of possible primal streams within primal streams 410 is enormous. Since stream processing application components 420 are preferably reusable software components, they may be configured and reconfigured into many different workflows to form a seemingly limitless number of stream processing applications. Also, the workflows may become very complex. For example, a given workflow may use tens of primal streams and include hundreds, if not thousands, of application components. To generate such a workflow by hand, and on demand, would be quite challenging if not simply impracticable. In fact, it is even difficult to know all possible components and their parameters, much less to be able to combine them into an effective workflow that satisfies all of the user's requirements.

FIG. 5 illustrates an example of stream processing in accordance with exemplary aspects of the described embodiments. In this example, end user 550 requests to be notified when a particular stock is likely to exceed a predetermined value. Primal streams 510, 520, 530 include trades, television news, and radio broadcasts. In the depicted example, application components include stock analytics 512, moving pictures experts group 4 (MPEG-4) de-multiplexer 522, image analytics 524, speech-to-text conversion 526, text analytics 528, speech-to-text conversion 532, text analytics 534, and a stock model 540.

This stream processing application may be composed from existing application components, using available primal streams, such that the application components generate a result that satisfies the user's request. Thus, stock analytics component 512 receives trades information stream 510 and outputs results to stock model component 540.

MPEG-4 de-multiplexer component 522 receives a television news broadcast stream 520 and outputs to image analytics component 524, text analytics component 528, and speech-to-text conversion component 526. Speech-to-text conversion component 526, in turn, outputs to text analytics component 528. Image analytics component 524 and text analytics component 528 output to stock model component 540.

Speech-to-text conversion component 532 receives radio broadcast stream 530 and outputs to text analytics component 534. In turn, text analytics component 534 outputs to stock model 540. Stock model 540 provides output to user 550.

For stream processing workflow composition with automatic planning, the following formal definitions are provided:

1. A data structure for describing stream content. This data structure specifies values of predicates about certain properties of the stream, as well as certain properties and other types of descriptions. An example of a property is "video of type MPEG-4." A numeric property may be, for instance, "throughput=10 KB/s." This structure may be referred to as stream properties.
2. An instance of stream properties structures is created and initialized with appropriate values for each primal stream.
3. A formal description for each stream processing component. Each description includes:
    a. Definition of one or more input ports, where each input port defines the conditions under which a stream can be connected to the input port. In programming, a predicate is a statement that evaluates an expression and provides a true or false answer based on the condition of the data. These conditions are expressed as logical expressions in terms of stream properties. For example, a stream of type "video" may be required on one port of a stream processing component, and a stream of type "audio" on another.
    b. Definition of one or more output ports, where each output port definition describes a formula or a method for computing all properties of the output stream, possibly depending on the properties of all input streams connected to the component.
4. Part of each end user's request for stream processing (goal) is translated to a formal logical expression in terms of stream properties that must be satisfied by the property values associated with the output stream, or multiple output streams if multiple goal definitions are given.

Given the above problem definition, where metadata descriptions 1-3 are referred to as a "planning domain" and 4 is referred to as the "planning problem," the planning algorithm can compute properties of any stream produced by a component or a combination of components applied to primal streams, and verify whether goal requirements are satisfied. For example, the method of exhaustive search (depth-first or breadth-first) can be used to find a workflow that produces streams satisfying goal requirements. In some systems, it is important to find workflows that not only satisfy the goal, but also satisfy additional criteria, such as optimal quality or optimal resource usage. The same exhaustive search method, or more efficient methods, may be used to achieve these objectives.

In one embodiment, the formal description of the workflow composition problem defined above may be encoded using planning domain definition language (PDDL), and submitted to a planning system, such as LPG-td, Metric-FF, or any other known planning system. LPG (Local search for Planning Graphs) is a planner based on local search and planning graphs that handles PDDL2.1 domains involving numerical quantities and durations. The system can solve both plan generation and plan adaptation problems. LPG-td is an extension of LPG to handle the new features of the standard planning domain description languages PDDL2.2. Metric-FF is a domain independent planning system developed by Jörg Hoffmann. The system is an extension of the FF (Fast-Forward) planner to handle numerical state variables, more precisely to PDDL 2.1 level 2, yet more precisely to the subset of PDDL 2.1 level 2 with algorithmic principles.

In one embodiment, stream properties may be encoded as fluents and predicates parameterized with a stream object. Component descriptions are encoded as actions parameterized with input and output stream objects. Preconditions of actions consist of translated input port requirements on input streams and action effects compute the properties of output stream objects with the transformation formulas associated with output ports. A plan generated by the planning system as a sequence of actions is then translated into a workflow by identifying input-output port connections based on the sharing of stream objects between instantiated action parameters corresponding to the port.

However, trying to implement automatic planning for stream processing workflows using PDDL presents several difficulties. The facts that a given stream contains some predicates and that the number of streams is restricted only by equivalence relations dictates that a lot of space is required to describe all possible streams. An action of a component with multiple inputs and outputs cannot be effectively decomposed into a set of actions with conjunctive form of conditional effects. Again, to accurately represent stream processing components requires an enormous amount of space.

Therefore, in one exemplary embodiment, an enhanced description language is provided. A stream processing planning language (SPPL) builds on the planning domain description language to address the special needs of stream processing workflow planning. XSPPL is a description language for stream processing workflow planning based on XPDDL, which is an extension of PDDL. Following is a description of the extensions to the description language for stream processing workflow planning.

Type represents a finite tree based on the inheritance relation. Only single (not multiple) inheritance is allowed. Type object is a root type for all types. Constants may be of certain types. The number of constants of a specific type may be high; however, that number is finite. Variables may be named or not named. Unnamed variables are used in the definition of the predicates and functions. Named variables are used in the actions definition.

Predicates represent variables on the system state. A predicate has a definition and possibly an initial value. A stream represents a variable on the set of predicates. A stream is a special type of object. For convenience, a stream is considered as partially grounded (some variables in the predicates signed) complete lists of predicates. SPPL and XSPPL identify two streams that incorporate identical predicates. SPPL and XSPPL use the notion of functions and elemental arithmetic operations in the same way as PDDL [PDDL2.2]. Computing metrics, such as CPU utilization or memory requirements, are mapped into the planning functions.

Relations are fixed associations between the constants. Autonomic systems make extensive use of the relation between user group and the component set to which that group has access. Actions have preconditions and effects. Both effects and preconditions are expressed in terms of streams. Each precondition is a set of expressions on a stream. SPPL and XSPPL consider the case of disjunctive preconditions for different streams. Each effect is a set of predicates associated with the stream, often dependent on preconditions.

FIGS. 6A-6D are example code fragments that illustrate definition of domain and the problem in a stream processing system in accordance with exemplary embodiments. More particularly, FIG. 6A illustrates the separation of the planning task on domain definition and problem definition. FIG. 6B illustrates an example of a problem definition that specifies the state of the system in the beginning of the planning process. The illustrated problem definition also contains definition of the planning task goal. FIG. 6C depicts a streamed goal definition that contains description of goal for the planning task specified in the problem definition file, as well as action definition defined in the domain definition file. FIG. 6D illustrates an example of the description of the streamed action.

Figure 7:
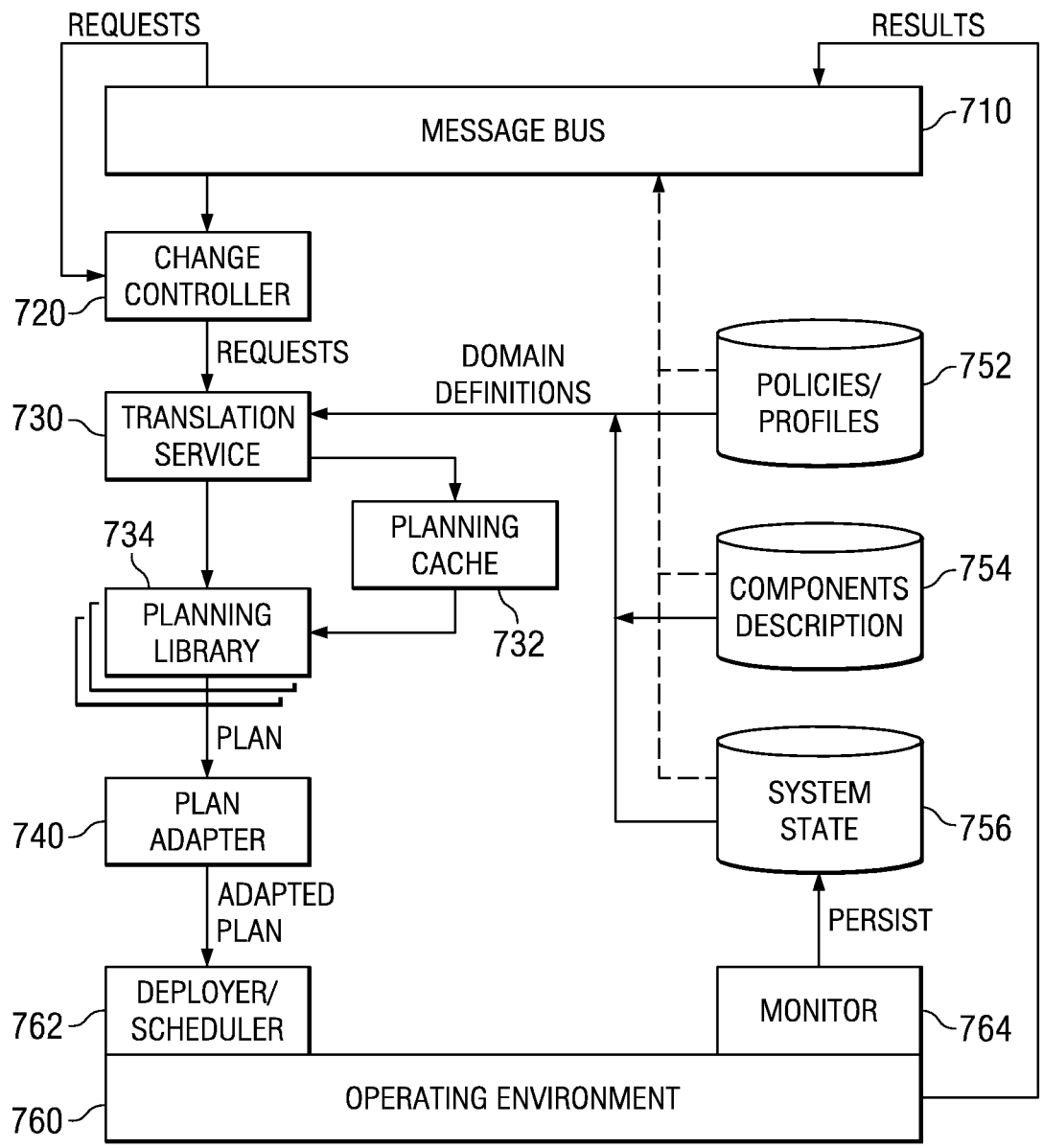
FIG. 7 is a block diagram illustrating an automated planning system in accordance with an exemplary embodiment of the present invention.

FIG. 7 is a block diagram illustrating an automated planning system in accordance with an exemplary embodiment of the present invention. Message bus 710 busses messages from producers to consumers. Change controller 720 receives requests from users and change notifications from message bus 710.

Change controller 720 uses translation service 730 to translate requests for planning into a description language. This description language may be an existing description language, such as PDDL, or may be an extended description language that addresses the specific needs of stream processing workflow composition, such as SPPL or XSPPL, which are described above. The requests that are translated into a description language are then sent to planning library 734 as a problem definition of the planning task.

Planning library 734 contains an algorithm for processing planning requests formulated in a planning description language and produces a plan graph with nodes corresponding to components and links corresponding to streams. An example of a planning graph is illustrated in FIG. 4, described above. Plan adapter 740 adapts the plan graph to the current configuration of operating environment 760. Deployer/scheduler 762 is used to provision and schedule plan execution in operating environment 760.

Monitor 764 monitors the state of operating environment 760 and persists observed state to system state database 756. Policies/profiles database 752 stores user profiles and policies for stream processing. Examples of policies are security policies like users from one department may have all possible access. A user profile may contain a definition of a user role and some possible exception that the user may have to access some extra information. Components description database 754 stores descriptions of the stream processing application components. Changes to databases 752, 754, 756 are sent through message bus 710 to change controller 720 as change notifications.

The contents of databases 752, 754, 756 represent the definitions of user profiles and policies, definitions of the application components, and the system state, respectively. This information together is referred to as the "domain definition." Translation service 730 translates the domain definition into the planning description language and stores the current domain definition in planning cache 732. Planning cache 732 is also updated upon notifications triggered by database modifications.

As stated above, change controller 720 receives direct requests for planning from users. Change controller 720 also is able to resubmit requests responsive to changes to profiles, policies, components, or system state. In this manner, a plan may be adjusted or adapted to changes in the stream processing system on the fly. For example, if a primal stream is no longer available, then the plan can be adjusted to satisfy the user's request without the stream. As another example, if a new component becomes available, existing tasks can be re-planned to take advantage of the new component.

A solver component, such as planning library 734 in FIG. 7, for example, may exploit a model checking approach as an algorithm for the solver. The main properties of symbolic model checking include an ability to deal with possibly huge state spaces—usually characteristic of combinatorial explosion—and an ability to automatically take into account internal symmetries, possibly hidden in the definitions of the predicates and actions. Properties to be checked are represented as computational tree logic (CTL) formulas. Formalization allows reducing space used, as each of the formulas represents a set of variables instead of individual variables.

Actions are represented as logical formulas. Logical formulas act as transformations on the state set. For the state variable s, its image under transformation T will be s'=Ts. The transformation formula is given by the following:

$$\forall \Xi \; \exists T, D(T) \; \exists s s \Lambda T s,$$

where $\Xi$ is a set of all transformations and $D(T)$ is a domain of the transformation T.

The algorithm searches in the space of transitions of the state set. The search starts from the initial state moving forward and from the goal state moving backward. The search stops when the sequence element started from initial state contains the sequence element started from the goal state (in this case, a feasible solution exists), or when both of the sequences become cyclic (in this case, no feasible solution exists).

Thereafter, the solution graph is extracted. Construction of the solution progresses in two directions—starting from resulting point to the initial and goal states. The resulting sequence of transformation sets forms the solution graph. An example data structure for representing the state set in the symbolic logic is a binary decision diagram (BDD).

In this representation, a stream may contain multiple predicates. Thus, a stream is mapped naturally into the domain of variables. In dealing with transition symmetry, the algorithm creates lookup tables for 2-compositions of transition functions. Based on resource consumption, the algorithm optimizes the lookup table of equivalent compositions. In dealing with object symmetry, the algorithm analyzes a transition table and defines groups of equivalent objects. During the transition stage, only one object from an equivalent group is used.

FIG. 8 is a flowchart illustrating operation of an automated planning system for stream processing workflow composition in accordance with an exemplary embodiment. FIG. 9 is a flowchart illustrating operation of system state monitoring in accordance with one exemplary embodiment. It will be understood that each block of the flowchart illustrations, and combinations of blocks in the flowchart illustrations, can be implemented by computer program instructions.

These computer program instructions may be provided to a processor or other programmable data processing apparatus to produce a machine, such that the instructions that execute on the processor or other programmable data processing apparatus create means for implementing the functions specified in the flowchart block or blocks. These computer program instructions may also exist within a computer-readable memory, storage, or transmission medium that can direct a processor or other programmable data processing apparatus to function in a particular manner. Instructions stored in a computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions, and computer usable program code for performing the specified functions. It will also be understood that each block of the flowchart illustrations, and combinations of blocks in the flowchart illustrations, can be implemented by special purpose hardware-based computer systems that perform the specified functions or steps, or by combinations of special purpose hardware and computer instructions.

With particular reference to FIG. 8, operation begins and the automated planning system receives a goal-based request (block 802). The automated planning system translates the request into a planning description language (block 804) and sends the request to a planning library as a problem definition (block 806). The automated planning system stores a domain definition in a planning cache (block 808).

The automated planning system generates a plan graph (block 810) and adapts the plan graph to the current configuration of the operating environment (block 812). Next, the automated planning system deploys the adapted plan to the operating environment (block 814).

Then, the automated planning system determines whether a new request is received (block 816). If a new request is received, operation returns to block 804 to translate the new request into the planning language (block 804), and the operation is repeated for the new request. If a new request is not received in block 816, the automated planning system determines whether a change notification is received (block 818). A change notification may be received if there is a change in user profile or policy, a change in application component definitions, or a change in system state. If a change notification is not received, operation returns to block 816 and the automated planning system repeats blocks 816 and 818 until a new request is received or a change notification is received. After a change notification is received, a determination is made as to whether the notification requires a change in the domain description (820). If not, operation returns to block 816 to determine whether a request is received.

If the automated planning system determines necessity of re-plan in response on change notification in block 820, then operation returns to block 808 where the automated planning system stores an updated domain definition in the planning cache and generates a new plan graph (block 810) for outstanding tasks affected by the change. Each new plan graph is then adapted (block 812) and deployed (block 814) for the updated domain. In this manner, the automated planning system is able to react to changes in the system state, new or unavailable primal streams or application components, and changes to user profiles and policies autonomously.

Turning now to FIG. 9, a flowchart illustrating operation of system state monitoring is shown. Operation begins and the automated planning system monitors the system state (block 902). The automated planning system determines whether a change in state is encountered (block 904). If there is not a change in state, then operation returns to block 902 to continue monitoring the system state.

If a change in state occurs in block 904, then the automated planning system persists the state to a system state database (block 906). Thereafter, the automated planning system generates a change notification (block 908) and operation returns to block 902 to continue monitoring the system state.

Automatic workflow composition results in cost savings due to eliminated need for specialized end user training or support personnel. The stream processing system with automatic planning is also self-healing. The system also benefits from a reduced time of response to changes, increased reliability, reduced possibility of human error, and increased security, since a system that supports automatic composition allows protection of the information concerning system configuration options from the end user.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a stream processing system, for composing stream processing workflows using automatic planning, comprising:
   receiving, by one or more processors of one or more computers, a request for stream processing in the stream processing system, wherein the stream processing system receives one or more primal streams and executes stream processing applications in a stream processing operating environment, wherein the request is a goal-based problem with specified restrictions, and wherein resulting output streams represent a flow of information satisfying the specified restrictions, wherein each primal stream is a stream that is received by the stream processing system, but that is not generated within the stream processing system;
   translating, by the one or more processors, the request for stream processing into a formal expression of the request in a description language;
   generating, by the one or more processors, a workflow based on the formal expression of the request and a domain definition in the description language, wherein the domain definition describes the stream processing operating environment, and wherein the workflow comprises a graph having nodes corresponding to stream processing application components with possible parameters values set and links corresponding to streams;
   adapting, by the one or more processors, the graph to a current configuration of the stream processing operating environment; and
   producing the resulting output streams in the stream processing system operating environment that satisfy the specified restrictions using the workflow.

2. The method of claim 1, further comprising:
composing the workflow into a stream processing application that is executable in a current configuration of the stream processing operating environment, wherein the stream processing application components are configured into the workflow to form the stream processing application.

3. The method of claim 2, further comprising:
deploying the stream processing application to the stream processing operating environment.

4. The method of claim 1, further comprising:
storing the domain definition in a planning cache.

5. The method of claim 1, further comprising:
receiving a change notification that indicates one or more changes to the domain definition; and
adjusting the workflow based on the one or more changes to the domain definition to form an adjusted workflow.

6. The method of claim 5, further comprising:
composing the adjusted workflow into an adjusted stream processing application that is executable in a current configuration of the operating environment, wherein the stream processing application components are reconfigured into the adjusted workflow to form the adjusted stream processing application.

7. The method of claim 6, further comprising:
deploying the adjusted stream processing application to the operating environment.

8. The method of claim 5, further comprising:
determining a new domain definition in response to the change notification; and
storing the new domain definition in a planning cache.

9. A stream processing system, for composing stream processing workflows using automatic planning, the stream processing system comprising:
   a stream processing operating environment;
   a controller configured to receive a request for stream processing in the stream processing system, wherein the stream processing system receives one or more primal streams and executes stream processing applications in the stream processing operating environment, wherein the request is a goal-based problem with specified restrictions, and wherein resulting output streams represent a flow of information satisfying the specified restrictions, wherein each primal stream is a stream that is received by the stream processing system, but that is not generated within the stream processing system;
   a translation service configured to translate the request for stream processing into a formal expression of the request in a description language;
   a planning library configured to generate a workflow based on the formal expression of the request and a domain definition in the description language, wherein the domain definition describes the stream processing operating environment, and wherein the workflow comprises a graph having nodes corresponding to stream processing application components with possible parameters values set and links corresponding to streams; and
   a plan adapter for adapting, by the one or more processors, the graph to a current configuration of an operating environment;
   wherein the stream processing application components are configured to produce the resulting output streams that satisfy the specified restrictions in the operating environment using the workflow; and wherein the stream processing system includes one or more processors, one or more computer-readable memories, and one or more computer-readable storage devices.

10. The stream processing system of claim 9, further comprising:

a plan adapter configured to compose the workflow into a stream processing application that is executable in a current configuration of the stream processing operating environment, wherein the stream processing application components are configured into the workflow to form the stream processing application.

11. The stream processing system of claim 10, further comprising:

a scheduler configured to deploy the stream processing application to the stream processing operating environment.

12. The stream processing system of claim 9, further comprising:

a planning cache configured to store the domain definition.

13. The stream processing system of claim 9, further comprising:

the controller configured to receive a change notification that indicates one or more changes to the domain definition; and the planning library configured to adjust the workflow based on the one or more changes to the domain definition to form an adjusted workflow.

14. The stream processing system of claim 13, further comprising:

the plan adapter configured to compose the adjusted workflow into an adjusted stream processing application that is executable in a current configuration of the operating environment, wherein the stream processing application components are reconfigured into the adjusted workflow to form the adjusted stream processing application.

15. The stream processing system of claim 14, further comprising:

a scheduler configured to deploy the adjusted stream processing application to the operating environment.

16. The stream processing system of claim 13, further comprising:

a planning cache configured to store a new domain definition responsive to receiving a change notification indicating a change in system state, user policy, user profile, or component description.

17. A computer program product for composing stream processing workflows using automatic planning, the computer program product comprising:

a computer readable storage device having computer usable program code embodied therein;

the computer usable program code configured to cause a processor to execute the computer usable program code comprising:

computer usable program code configured to receive a request for stream processing in a stream processing system, wherein the stream processing system receives one or more primal streams and executes stream processing applications in a stream processing operating environment, wherein the request is a goal-based problem with specified restrictions, and wherein resulting output streams represent a flow of information satisfying the specified restrictions, wherein each primal stream is a stream that is received by the stream processing system, but that is not generated within the stream processing system;

computer usable program code configured to translate the request for stream processing into a formal expression of the request in a description language;

computer usable program code configured to generate a workflow based on the formal expression of the request and a domain definition in the description language, wherein the domain definition describes the stream processing operating environment, and wherein the workflow comprises a graph having nodes corresponding to stream processing application components with possible parameters values set and links corresponding to streams;

computer usable program code configured to adapt the graph to a current configuration of an operating environment; and computer usable program code configured to produce the resulting output streams that satisfy the specified restrictions in the operating environment using the workflow.

18. The computer program product of claim 17, further comprising:

computer usable program code configured to compose the workflow into a stream processing application that is executable in a current configuration of the stream processing operating environment, wherein the stream processing application components are configured into the workflow to form the stream processing application.

19. The computer program product of claim 18, further comprising:

computer usable program code configured to deploy the stream processing application to the stream processing operating environment.

20. The computer program product of claim 17, further comprising:

computer usable program code configured to receive a change notification that indicates one or more changes to the domain definition; and computer usable program code configured to adjust the workflow based on the one or more changes to the domain definition to form an adjusted workflow.

* * * * *